United States Patent [19]

Amembal et al.

[11] 4,234,656
[45] Nov. 18, 1980

[54] REPROCESSABLE THERMOPLASTIC GRAFT COPOLYMER OF PROPYLENE POLYMER AND ETHYLENE COPOLYMER

[75] Inventors: Amar Amembal, Edison; Robert Bostwick, Somerset, both of N.J.; Richard G. Shaw, Remsen, N.Y.

[73] Assignee: Union Carbide Corporation, New York, N.Y.

[21] Appl. No.: 971,182

[22] Filed: Dec. 20, 1978

[51] Int. Cl.$^3$ ...................... C08L 23/08; C08L 23/12
[52] U.S. Cl. ................................ 428/379; 260/42.46; 260/42.52; 260/45.95 R; 525/194; 525/222; 525/227
[58] Field of Search .................... 260/897 B; 525/222, 525/227, 194

[56] References Cited

U.S. PATENT DOCUMENTS

| | | | |
|---|---|---|---|
| 3,433,573 | 3/1969 | Holladay et al. | 8/55 |
| 3,789,085 | 1/1974 | Kishimoto et al. | 260/897 B |
| 4,116,914 | 9/1978 | Coran et al. | 260/30.6 R |

Primary Examiner—Carman J. Seccuro
Attorney, Agent, or Firm—Donald M. Papuga; Warrick E. Lee, Jr.

[57] ABSTRACT

Reprocessable thermoplastic graft copolymers of propylene polymer and ethylene copolymer are herein described. These graft copolymers are prepared by heating the propylene polymer and ethylene copolymer in the presence of select peroxides in order to graft the propylene polymer onto the ethylene copolymer.

14 Claims, No Drawings

REPROCESSABLE THERMOPLASTIC GRAFT COPOLYMER OF PROPYLENE POLYMER AND ETHYLENE COPOLYMER

BACKGROUND OF THE INVENTION

1. Field of the Invention

This invention relates to reprocessable thermoplastic graft copolymers of propylene polymer and ethylene copolymer. These graft copolymers are prepared by heating propylene polymer and ethylene copolymer in the presence of select peroxides in order to graft the propylene polymer onto the ethylene copolymer.

2. Description of the Prior Art

Polypropylene has excellent high temperature performance compared to polyethylene. However, polypropylene is brittle, rigid, has poor low temperature properties and has a very low elongation, which prevents its use in many applications including use as insulation for wire and cable.

Ethylene copolymers possess a good balance of properties including tensile strength, abrasion resistance, stress crack resistance and low temperature properties. Also, its outstanding electrical properties make it suitable for use as insulation for wire and cable. The ethylene copolymers are generally vulcanized (cured) to provide molded or shaped articles with good physical properties. Also, when used in insulation for wire and cable, the ethylene copolymer is cured to provide improved thermal properties. However, the vulcanization or curing step is expensive and time consuming. Additionally, after vulcanization the material cannot be reprocessed.

U.S. Pat. No. 3,433,573 describes blends of 5 to 95 percent by weight of propylene polymer and 95 to 5 percent by weight of a copolymer of ethylene and a polar monomer such as vinyl acetate. It is stated therein that these compositions have improved flexibility and toughness at both room temperature and below 0° C. while retaining a large measure of its high temperature properties. These compositions may be vulcanized or cured by peroxides or other means.

However, blends of polypropylene and ethylene copolymers are generally incompatible over a wide range which results in unacceptable properties such as, tensile strength, elongation and deformation of a composition containing said blend.

SUMMARY OF THE INVENTION

It has now been unexpectedly found that a thermoplastic graft copolymer of propylene polymer and ethylene copolymer has an improved combination of properties such as elongation, tensile strength, flexibility and deformation.

An object of this invention is to provide a thermoplastic graft copolymer of propylene polymer and ethylene copolymer which is reprocessable and has improved properties such as elongation, tensile strength, flexibility and deformation.

A further object of this invention is to provide insulation, including semi-conductive insulation, containing a thermoplastic graft copolymer of propylene polymer and ethylene copolymer for wire and cable, particularly low voltage wire and cable ($\leq 5000$ volts).

A further object of this invention is to provide a thermoplastic graft copolymer of propylene polymer and ethylene copolymer for molding applications.

A further object of this invention is to provide a process for preparing a thermoplastic graft copolymer of propylene polymer and ethylene copolymer by heating the propylene polymer and ethylene copolymer in the presence of select peroxides in order to graft the propylene polymer onto the ethylene copolymer.

These and other objects of the present invention are achieved by a thermoplastic graft copolymer of propylene polymer and ethylene copolymer.

DESCRIPTION OF THE PREFERRED EMBODIMENTS

The thermoplastic graft copolymer of the present invention comprises propylene polymer grafted onto an ethylene copolymer by the use of select peroxides.

The propylene polymer suitable for use herein is a propylene homopolymer or a copolymer thereof containing propylene and from about 5 to about 10 percent by weight of ethylene. The propylene polymers have a melt index in the range of from about 0.6 to about 30 decigrams per minute (ASTM D-1238 Condition L at 44 psi tested pressure).

The ethylene copolymers suitable for use herein are copolymers of ethylene and at least one comonomer such as vinyl acetate, methyl methacrylate and alkyl acrylates. These ethylene copolymers include ethylene-vinyl acetate and ethylene-alkyl acrylate. The preferred copolymers are ethylene-vinyl acetate and ethylene-ethyl acrylate. The ethylene copolymers contain from about 2 to about 40 and preferably, from about 10 to about 20 percent by weight of comonomer. In other words, the ethylene copolymers contain more than 60 and preferably more than 80 weight percent ethylene. The ethylene copolymer has a melt index of from about 0.5 to about 10 decigrams per minute (ASTM D-1238 at 44 psi tested pressure).

The graft copolymers of the present invention contain from about 15 to about 50 and preferably, from about 25 to about 35 percent by weight of propylene polymer and from about 85 to about 50 and preferably, from about 65 to about 75 percent by weight of ethylene copolymer.

The propylene polymer is grafted onto the ethylene copolymer by heating a mixture of the propylene polymer and ethylene copolymer in the presence of peroxides which have a half life of one minute at $\geq 140°$ C. The preferred peroxides include:

Dicumyl Peroxide
Bis(t-butylperoxy) Diisopropyl Benzene
2,5-Dimethyl-2,5-Di(t-butylperoxy)Hexane
2,4-Pentanedione Peroxide
Di-t-butyl Peroxide The peroxide is used in amounts of from about 0.1 to about 0.75 and preferably, from about 0.2 to about 0.50 weight percent, based on the total weight of propylene polymer and ethylene copolymer.

The graft copolymers of the present invention may include about 0.01 to about 3.0 weight percent and preferably, from about 0.05 to about 1.0 weight percent, based on the total weight of the graft copolymer, one or more suitable high temperature antioxidants.

These antioxidants are preferably sterically hindered phenols. Such compounds would include sterically hindered phenols such as:

1,3,5-trimethyl-2,4,6-tris(3,5-di-tertiary-butyl-4-hydroxy benzyl)benzene;
1,3,5-tris(3,5-di-tertiary butyl-4-hydroxy-benzyl) 5-triazine-2,4,6-(1H,3H,5H)trione;

tetrakis-[methylene-3-(3', 5-di-t-butyl-4'-hydroxy phenyl)-propionate] methane, as well as antioxidants such as:
di(2-dihydro-2,2,4-trimethylquinoline), and
Polymerized 2,2,4-trimethyl dihydroquinoline.

The antioxidants may be used individually, or in combination with one another. When the sterically hindered phenol antioxidants are used, they are added after formation of the graft copolymer. Other types of antioxidants may be added prior to the formation of the graft copolymer.

The graft copolymers of this invention may also include adjuvants such as fillers, stabilizers, metal deactivators, extenders, lubricants, and the like. The fillers include carbon blacks, talc, hydrated magnesium silicate, calcium silicate and alumina. The lubricants include fatty acid soap or metallic derivations thereof such as, calcium sterate. The carbon blacks include all electrically conductive carbon blacks.

These adjuvants would be used in amounts designed to provide the intended effect in the resulting composition. The total amount of adjuvants used will range from 0 to 60 weight percent based on the total weight of the composition.

The graft copolymers of the invention may be prepared by heating a mixture of the propylene polymer, ethylene copolymer and peroxide at elevated temperatures sufficient to effect the grafting reaction. Preferably the mixture of propylene polymer and ethylene copolymer is molten and intimately mixed prior to the decomposition of the peroxide. Mixing and reaction of the components may be carried out in most any conventional equipment including a two roll rubber mill, Banbury type mixer or extruder. The propylene polymer and ethylene copolymer may be preblended with or without the peroxide. In all procedures, intimate and thorough mixing of the components, including the peroxide, is important to obtain optimum results. The grafting reaction itself is generally effected by heating the components, desirably while maintaining mixing, to the decomposition temperature of the peroxide. This temperature is between 165° and 220° C. A temperature of at least 165° C. is usually the minimum required to effect the grafting reaction, depending largely on the particular peroxide employed.

The graft copolymer of the present invention may also be prepared by heating a mixture of the propylene polymer and ethylene copolymer to obtain an intimate mixture thereof and then cooling and pelletizing the mixture. The pellets are then placed in a suitable vessel such as, a ribbon blender or tumbler, and then heated to an elevated temperature, preferably about 60° C. A peroxide is then introduced into this vessel and allowed to soak into the pellets. After the peroxide has soaked into the pellets, they are cooled to room temperature. The pellets may then be stored for future use. The grafting reaction takes place when the pellets are heated to a temperature between about 165° and 220° C.

Another method of preparing the graft copolymers of this invention is by heating a mixture of the propylene polymer and ethylene copolymer to obtain an intimate mixture thereof and then cooling and pelletizing the mixture. When these pellets are put into an extruder and melted, peroxide can be injected into the polymer melt along the extruder barrel. The grafting reaction occurs when the temperature is between about 165° and 220° C. Alternatively, the pellets and peroxide can be fed into the extruder and grafting takes place when the temperature is between about 165° and 220° C.

Time for the grafting may vary widely depending on the amount of propylene polymer to be grafted and peroxide, as well as temperature employed, but is generally surprisingly short in the more preferred emobodiments of the invention. Thus, substantial grafting can be effected in as little as one minute at the higher temperature and higher proportions of ethylene copolymer and peroxide.

Additives, such as fillers, may be admixed with the compositions either before, during or after the grafting reaction.

The graft copolymers of this invention are reprocessable which is an important characteristic. Generally, with vulcanized (cured) ethylene copolymers, the flash or scrap material cannot be reprocessed. On the other hand, the scrap from thermoplastic materials can be reprocessed. The graft copolymers of the present invention are thermoplastic.

The following examples will serve to illustrate the practice of the invention.

EXAMPLE 1

A mixture of the following: 60 parts by weight of ethylene-vinyl acetate copolymer, having a melt index of 20 and containing 28 percent by weight of vinyl acetate; 40 parts by weight of polypropylene homopolymer having a melt flow of 0.8 g/10 min (ASTM-D-1238, Condition L); and 0.5 parts by weight of $\alpha$, $\alpha'$-bis(t-butylperoxy-diisopropyl-benzene) was compounded in a Banbury mixer. Thorough mixing was ensured and the melt temperature was allowed to reach 190° C.

CONTROL A

Example 1 was exactly repeated except that no peroxide was used.

EXAMPLE 2

A mixture of the following: 60 parts by weight of ethylene-ethyl acrylate copolymer, having a melt index of 4.5 and containing 20 parts by weight ethyl acrylate; 40 parts by weight of polypropylene homopolymer, as in Example 1; and 0.5 parts by weight of peroxide, as in Example 1, was compounded in a Banbury mixer. Through mixing was ensured and the melt temperature was allowed to reach 190° C.

CONTROL B

Example 2 was exactly repeated except that no peroxide was used.

The compositions as prepared in Examples 1 and 2 and Controls A and B were molded into test specimens as required by the following test procedures and subjected to the following test procedures: Tensile strength and Elongation, ASTM-D-412; 1% Secant Modulus, ASTM-D-638. Brittle temperature, ASTM-D-746 and Deformation at 155° C., ASTM-D-621. The results are set forth in Table I as follows:

TABLE I

| Example | 1 | Control A | 2 | Control B |
|---|---|---|---|---|
| Tensile strength, psi | 2710 | 1330 | 2540 | 2030 |
| Elongation, percent | 423 | 10 | 483 | 77 |
| 1% Secant modulus, psi | 20,000 | 33,500 | 23,600 | 37,700 |
| Brittle temperature, °C. | −33 | −15 | −47 | −38 |

TABLE I-continued

| Example | 1 | Control A | 2 | Control B |
|---|---|---|---|---|
| % Deformation at 155° C. | 23.8 | 53.8 | 31.5 | 45.2 |

The data in the Table show that the graft copolymers of the present invention compounded with peroxide (Examples 1 and 2) have improved elongation, tensile strength, lower brittle temperature, and lower percent deformation, as compared to mixtures of propylene homopolymer and ethylene copolymer compounded without peroxide.

EXAMPLE 3

This example illustrates the reprocessability characteristics of the graft copolymers of the present invention. The composition as prepared in Example 2 was used except that 0.75 weight percent of tetrakis[methylene 3-(3',5'-di-tert-butyl-4'-hydroxyphenyl)proprionate] methane antioxidant was added.

In order to determine the reprocessability characteristics of this composition, the material was sequentially extruded three times through a Brabender extruder at 190° C. Part of the extrudate was collected after each extrusion to measure physical properties and the remainder was extruded again. In all the experiments the extrudate was visually observed to be smooth. The tensile strength and elongation of the material was measured according to the procedure described, supra, while the melt index (MI) was determined according to ASTM D-1238 at 190° C., 44 psi. The results are set forth in Table II as follows:

TABLE II

| Number of Times Reprocessed | Tensile Strength (psi) | Elongation (%) | MI, (dg/min.) |
|---|---|---|---|
| 0 | 2030 | 477 | 3.22 |
| 1 | 2140 | 483 | 2.86 |
| 2 | 2020 | 445 | 2.94 |
| 3 | 1910 | 487 | 3.09 |

The results in Table II clearly demonstrate reprocessability of the graft copolymers of the present invention, with no significant change in tensile strength, elongation or melt index.

EXAMPLES 4 to 7

The compositions of these Examples were prepared by the method as described in Example 1. The formulations of the compositions are set forth in Table III as follows (The amounts of ethylene vinyl acetate and polypropylene are in parts whereas the other ingredients are in parts per 100 parts of polymer):

TABLE III

| Example | 4 | 5 | 6 | 7 |
|---|---|---|---|---|
| Ethylene-vinyl acetate[a] | 65 | 65 | 65 | 65 |
| Polypropylene[b] | 35 | 35 | 35 | 35 |
| Carbon Black | 14 | 14 | 14 | 14 |
| Antioxidant[c] | 0.5 | 0.5 | 0.5 | 0.5 |
| Calcium stearate | 1.0 | 1.0 | 1.0 | 1.0 |
| Peroxide[d] | — | 0.1 | 0.3 | 0.5 |

[a] 10 percent by weight vinyl acetate
[b] 0.8 melt flow
[c] Polymerized 2,2,4-trimethyl quinoline
[d] α,α bis(t-butylperoxy) diisopropyl benzene The compositions of Table III were processed into test specimens as required by the following test procedures and subject to the following test procedures as described, supra: Elongation and Secant Modulus at 125° C.

The results are as set forth in Table IV as follows:

TABLE IV

| Example | 4 | 5 | 6 | 7 |
|---|---|---|---|---|
| Elongation (percent) | 75 | 454 | 412 | 395 |
| Modulus (psi) | 300 | 800 | 750 | 960 |

The data of Table IV show that the graft copolymers of the present invention prepared with peroxide (Examples 5 to 7) have both higher elongation and secant modulus than a blend of ethylene-vinyl acetate and polypropylene prepared without peroxide (Example 4).

EXAMPLE 11 to 13

The compositions of these Examples were prepared by the methods as described in Example 1. The formulations of the compositions are set forth in Table V as follows (The amounts of copolymer and polypropylene are in parts whereas the other ingredients are in parts per 100 parts of polymer):

TABLE V

| Example | 8 | 9 | 10 | 11 | 12 | 13 |
|---|---|---|---|---|---|---|
| Ethylene-vinyl acetate[a] | 65 | 65 | 65 | 65 | — | — |
| (percent by weight vinyl acetate) | (4.7) | (8.9) | (11.4) | (18.7) | | |
| Ethylene-ethyl acrylate[b] | — | — | — | — | 65 | 65 |
| (percent by weight ethyl acrylate) | | | | | (13.0) | (20.5) |
| Polypropylene[c] | 35 | 35 | 35 | 35 | 35 | 35 |
| Carbon black | 14 | 14 | 14 | 14 | 14 | 14 |
| Calcium stearate | 1 | 1 | 1 | 1 | 1 | 1 |
| Antioxidant[d] | 0.5 | 0.5 | 0.5 | 0.5 | 0.5 | 0.5 |
| Peroxide[e] | 0.5 | 0.5 | 0.5 | 0.5 | 0.6 | 0.6 |

[a] Melt Index: Ex. 8: 2.0; Ex. 9: 3.0; Ex. 10: 1.9; Ex. 11: 3.0
[b] Melt Index: Ex. 12: 2.5–3.0; Ex. 13: 4.5
[c] 0.8 Melt flow
[d] 0.25 parts of tetrakis [methylene 3-(3',5'-di-tert-butyl-4'-hydroxyphenyl)propionate] methane and 0.25 parts n, n'-bis(3,5-di-tert-butyl-4-hydroxy-hydrocinnamoyl) hydrazine
[e] α,α'bis(t-butylperoxy)diisopropyl benzene The compositions of Table V were processed into test specimens as required by the following test procedures and subjected to the following test procedures as described, supra,: Elongation and Secant Modulus. The results are as set forth in Table VI as follows:

TABLE VI

| Example | 8 | 9 | 10 | 11 | 12 | 13 |
|---|---|---|---|---|---|---|
| Elongation (percent) | 293 | 455 | 335 | 412 | 425 | 452 |
| Modulus (psi) | 680 | 920 | 900 | 1100 | 660 | 900 |

The data of Table VI show that a graft copolymer of polypropylene and ethylene-vinyl acetate (Examples 8 to 11) or ethylene-ethyl acrylate (Examples 12 and 13) containing varying amounts of vinyl-acetate and ethyl-acrylate, respectively, have good elongation and secant modulus values.

EXAMPLES 14 to 27

The compositions of these Examples were prepared by the method as described in Example 1. The formulations of the compositions are set forth in Table VII as follows (The amounts of copolymer and polypropylene are in parts whereas the other ingredients are in parts per 100 parts of polymer):

TABLE VII

| Example | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Ethylene-vinyl acetate[a] | 70 | 70 | 70 | 70 | 70 | 70 | 70 | 70 | — | — | — | — | — | — |
| (percent by weight vinyl acetate) | (4.7) | (4.7) | (4.7) | (18) | (18) | (18) | (18) | (18) | | | | | | |
| Ethylene-ethyl acrylate[b] | — | — | — | — | — | — | — | — | 70 | 70 | 70 | 70 | 70 | 70 |
| (percent by weight ethyl acrylate) | | | | | | | | | (2.0) | (2.0) | (2.0) | (20.5) | (20.5) | (20.5) |
| Polypropylene[c] | 30 | 30 | 30 | 30 | 30 | 30 | 30 | 30 | 30 | 30 | 30 | 30 | 30 | 30 |
| Calcium stearate | 1 | 1 | 1 | 1 | 1 | 1 | 1 | 1 | 1 | 1 | 1 | 1 | 1 | 1 |
| Antioxidant[d] | 0.2 | 0.2 | 0.2 | 0.2 | 0.2 | 0.2 | 0.2 | 0.2 | 0.2 | 0.2 | 0.2 | 0.2 | 0.2 | 0.2 |
| Peroxide[e] | — | 0.1 | 0.5 | — | 0.1 | 0.3 | 0.5 | 0.7 | — | 0.1 | 0.5 | — | 0.1 | 0.5 |

[a] Melt index: 2.0 in Examples 14 to 16 and 3.0 in Examples 17 to 21
[b] Melt index: 2.1 in Examples 22 to 24 and 4.5 in Examples 25 to 27
[c] 0.8 melt flow
[d] 0.25 parts of tetrakis[methylene 3-(3',5'-di-tert-butyl-4'-hydroxyphenyl)propionate] methane and 0.25 parts of n, n'-bis(3,5-di-tert-butyl-4-hydroxy-hydrocinnamoyl)hydrazine
[e] α,α'bis(t-butylperoxy) diisopropyl benzene The compositions of Table VII were processed into test specimens as required by the following test procedures and subjected to the following test procedures as described, supra,: Elongation and Secant Modulus.

The results are set forth in Table VIII as follows:

TABLE VIII

| Example | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Elongation (percent) | 502 | 650 | 405 | 367 | 537 | 452 | 235 | 162 | 625 | 625 | 332 | 625 | 692 | 475 |
| Modulus (psi) | 388 | 1391 | 611 | 0 | 1078 | 1280 | 1280 | 822 | 0 | 1100 | 380 | 103 | 1186 | 638 |

The data of Table VIII show that graft copolymers of polypropylene and either ethylene-vinyl acetate (Examples 15, 16 and 18 to 21) or ethylene-ethyl acrylate (Examples 23, 24, 26 and 27) of the instant invention have higher modulus and/or percent elongation than blends of polypropylene and ethylene-vinyl acetate (Examples 14 and 17) or ethylene-ethyl acrylate (Examples 22 and 25).

EXAMPLES 28 to 31

The compositions of these Examples were prepared by the method as described in Example 1. The formulations of the compositions are set forth in Table IX as follows:

TABLE IX

| Example | 28 | 29 | 30 | 31 |
|---|---|---|---|---|
| Ethylene-vinyl acetate[a] | 70 | 65 | 70 | 65 |
| Polypropylene[b] | 30 | 35 | 30 | 35 |
| Carbon black | — | — | 14 | 14 |
| Antioxidant[c] | 0.50 | 0.50 | 0.50 | 0.50 |
| Calcium stearate | 1 | 1 | 1 | 1 |
| Peroxide[d] | 0.7 | 0.7 | 0.7 | 0.7 |

[a] 18 percent by weight vinyl acetate: Melt Index 3.0
[b] 0.8 Melt flow
[c] 0.25 parts of tetrakis[methylene 3-(3',5'-di-tertbutyl-4'-hydroxyphenyl) propionate]methane and 0.25 parts of n, n'-bis(3,5-di-tert-butyl-4-hydroxy-hydrocinnamoyl) hydrazine
[d] α,α'bis(t-butylperoxy) diisopropyl benzene A No. 14 AWG solid copper wire was coated with the compositions of Examples 28 to 31 to give a 30 mil thickness. The following properties of the insulation were measured: Tensile strength, elongation, cold bend, flat bar impact, mechanical water absorption and heat aged tensile strength and elongation at 121° C. and 135° C. according to the procedures of UL Standard 44.

The results are as set forth in Table X as follows:

TABLE X

| Example | 28 | 29 | 30 | 31 | UL Requirement |
|---|---|---|---|---|---|
| Tensile strength, psi | 3210 | 3300 | 2470 | 2590 | >1500 |
| Elongation, percent | 500 | 520 | 370 | 415 | >150 |
| Cold bend, °C. | <−70 | −65 | −55 | <−70 | <−25 |
| Flat bar impact, ft. lb. | 4 | 3 | 5 | 4 | >2 |
| Mechanical water Absorption, mg/in$^2$ | 13.5 | 13 | 13.3 | 12.1 | <15 |
| Deformation, percent | 7.8 | 4.3 | 15.6 | 6.0 | <30 |
| Tensile strength, percent of original | 95 | 95 | 95 | 97 | >75 |
| (10 days at 121° C.) | | | | | |
| Tensile strength, percent of original | 89 | 77 | 82 | 87 | >75 |
| (7 days at 135° C.) | | | | | |
| Elongation, percent of original | 89 | 95 | 99 | 104 | — |
| (10 days at 121° C.) | | | | | |
| Elongation, percent of original | 90 | 87 | 81 | 80 | — |
| (7 days at 135° C.) | | | | | |

The data show that the graft copolymers of the present invention far surpass the requirements of UL Standard 44 for insulation for wire and cable.

What is claimed is:

1. A reprocessable graft copolymer comprising (A) ethylene copolymer containing more than 60 weight percent ethylene and at least one comonomer selected from the group consisting of vinyl acetate and alkyl acrylates or methacrylates and (B) propylene polymer grafted to said ethylene copolymer with from about 0.1 to about 0.75 weight percent, based on the weight of (A) and (B), of a peroxide having a half life of one minute at ≥140° C.

2. A graft copolymer as in claim 1 wherein the ethylene copolymer is ethylene-vinyl acetate.

3. A graft copolymer as in claim 1 wherein the ethylene copolymer is ethylene-ethyl acrylate.

4. A graft copolymer as in claim 1 wherein the peroxide is present in an amount of from about 0.20 to about 0.50 weight percent, based on the weight of (A) and (B).

5. A graft copolymer as in claim 1 which contains antioxidant.

6. A graft copolymer as in claim 1 which contains carbon black.

7. A graft copolymer as in claim 1 which contains from about 85 to about 50 percent by weight of ethylene copolymer and from about 15 to about 50 percent by weight of propylene polymer.

8. A process for producing a reprocessable graft copolymer which comprises forming a mixture comprising (A) from about 85 to 50 percent by weight of ethylene copolymer containing more than 60 weight percent ethylene and at least one comonomer selected from the group consisting of vinyl acetate and alkyl acrylates or methacrylates; (B) from about 15 to 50 percent by weight of propylene polymer; and (C) from about 0.1 to about 0.75 weight percent, based on the weight of (A) and (B), of a peroxide having a half life of one minute at $\geq 140°$ C. and heating said mixture at a temperature between about 165° and 220° C. to graft the propylene polymer to said ethylene copolymer.

9. An electrical wire or cable insulated with a graft copolymer containing composition, said graft copolymer being reprocessable and comprising (A) ethylene copolymer containing more than 60 weight percent ethylene and at least one comonomer selected from the group consisting of vinyl acetate and alkyl acrylates or methacrylates and (B) propylene polymer grafted to said ethylene copolymer with from about 0.1 to about 0.75 weight percent, based on the weight of (A) and (B), of a peroxide having a half life of one minute at $\geq 140°$ C.

10. A reprocessable molded article of a graft copolymer comprising (A) ethylene copolymer containing more than 60 weight percent ethylene and at least one comonomer selected from the group consisting of vinyl acetate and alkyl acrylates or methacrylates and (B) propylene polymer grafted to said ethylene copolymer with from about 0.1 to about 0.75 weight percent, based on the weight of (A) and (B), of a peroxide having a half life of one minute at $\geq 140°$ C.

11. The graft copolymer of claim 1 wherein the ethylene copolymer contains more than 80 weight percent ethylene.

12. The process of claim 8 wherein the ethylene copolymer contains more than 80 weight percent ethylene.

13. The electrical wire of claim 9 wherein the ethylene copolymer comtains more than 80 weight percent ethylene.

14. The molded article of claim 10 wherein the ethylene copolymer contains more than 80 weight percent ethylene.

* * * * *